United States Patent [19]

Horiuchi et al.

[11] Patent Number: 5,628,975
[45] Date of Patent: May 13, 1997

[54] METHOD FOR PURIFYING EXHAUST GAS FROM A DIESEL ENGINE

[75] Inventors: Makoto Horiuchi, Himeji; Noboru Miyake, Hyogo; Toshimasa Kushihara; Koichi Saito, both of Himeji, all of Japan

[73] Assignee: Nippon Shokubai Kagaku Kogyo Co., Ltd., Osaka, Japan

[21] Appl. No.: 185,159

[22] Filed: Jan. 24, 1994

Related U.S. Application Data

[63] Continuation of Ser. No. 79,843, Jun. 22, 1993, abandoned, which is a continuation of Ser. No. 826,663, Jan. 29, 1992, abandoned, which is a continuation of Ser. No. 475,929, Feb. 6, 1990, abandoned.

[30] Foreign Application Priority Data

Feb. 6, 1989 [JP] Japan ................ 1-25821

[51] Int. Cl.$^6$ ................ B01D 53/94
[52] U.S. Cl. ........... 423/213.2; 423/212; 423/213.5; 423/245.3; 423/215.5
[58] Field of Search ............ 423/212 C, 213.2, 423/213.5, 213.7, 245.3, 215.5

[56] References Cited

U.S. PATENT DOCUMENTS

| | | | |
|---|---|---|---|
| 3,785,781 | 1/1974 | Hervert et al. | 23/288 F |
| 3,790,654 | 2/1974 | Basley | 428/116 X |
| 3,839,225 | 10/1974 | Acres | 502/117 |
| 4,042,738 | 8/1977 | Gulati | 502/439 X |
| 4,162,235 | 7/1979 | Acres et al. | 423/213.5 |
| 4,233,351 | 11/1980 | Okumura et al. | 502/439 |
| 4,239,656 | 12/1980 | Fujita et al. | 252/462 |
| 4,253,992 | 3/1981 | Soejima et al. | 428/116 X |
| 4,335,023 | 6/1982 | Dettling et al. | 502/439 X |
| 4,358,428 | 11/1982 | Fujita et al. | 502/527 X |
| 4,617,289 | 10/1986 | Saito et al. | 502/339 |
| 4,711,009 | 12/1987 | Cornelison et al. | 422/180 X |
| 4,711,870 | 12/1987 | Yamada et al. | 502/303 |
| 4,795,615 | 1/1989 | Cyron et al. | 422/179 |
| 4,808,564 | 2/1989 | Matsumoto et al. | 502/303 |
| 4,828,807 | 5/1989 | Domesle et al. | 423/213.7 |
| 4,833,115 | 5/1989 | Koschlig et al. | 502/527 X |
| 4,840,827 | 6/1989 | Mizutani et al. | 502/527 X |
| 4,870,045 | 9/1989 | Gasper et al. | 502/439 |
| 4,921,829 | 5/1990 | Ozawa et al. | 502/302 |
| 4,931,419 | 6/1990 | Blanchard et al. | 502/304 |
| 5,059,575 | 10/1991 | Jorgensen et al. | 502/304 |
| 5,071,816 | 12/1991 | Horiuchi et al. | 502/302 |
| 5,157,007 | 10/1992 | Domesle et al. | 502/66 |
| 5,221,484 | 6/1993 | Goldsmith et al. | 210/650 |
| 5,272,125 | 12/1993 | Weible et al. | 502/242 |
| 5,320,998 | 6/1994 | Hiriuchi et al. | 502/245 |
| 5,371,056 | 12/1994 | Leyrer et al. | 502/66 |
| 5,514,354 | 5/1996 | Domesle et al. | 423/213.5 |

FOREIGN PATENT DOCUMENTS

| | | | |
|---|---|---|---|
| 0254165 | 1/1988 | European Pat. Off. . | |
| 0283224 | 9/1988 | European Pat. Off. . | |
| 0462593 | 12/1991 | European Pat. Off. | 423/215.5 |
| 0499931 | 8/1992 | European Pat. Off. | 423/215.5 |
| 2343505 | 3/1977 | France . | |
| 3012182 | 10/1980 | Germany . | |
| 3726580 | 3/1988 | Germany | 423/213.5 |
| 4226111 | 2/1994 | Germany | 423/215.5 |
| 63-143941 | 12/1986 | Japan . | |
| 63-339633 | 2/1988 | Japan | 423/213.5 |
| 63-126528 | 5/1988 | Japan . | |
| 63-187869 | 5/1988 | Japan | 502/527 |
| 63-315150 | 12/1988 | Japan . | |
| 1307448 | 12/1989 | Japan | 423/213.5 |
| 1307452 | 12/1989 | Japan | 423/213.5 |
| 3262541 | 11/1991 | Japan | 423/215.5 |
| 5-288549 | 12/1991 | Japan | 423/245.3 |
| 4200637 | 7/1992 | Japan | 423/215.5 |
| 6210172 | 8/1994 | Japan | 423/215.5 |

Primary Examiner—Gary P. Straub
Assistant Examiner—Timothy C. Vanoy
Attorney, Agent, or Firm—Sherman and Shalloway

[57] ABSTRACT

A method for purifying exhaust gases from a diesel engine is provided. The method utilizes a flow through type honeycomb catalyst having parallel through-cells and (1) a cross-sectional area at the inlet part of an exhaust gas cut by a face vertical to the direction of the through-cells of 10 to 100 cm$^2$, preferably 20 to 80 cm$^2$, per liter of the displacement of the engine, (2) an hydraulic diameter of the through-cells of 1.00 to 2.00 mm, preferably 1.10 to 1.40 mm, and (3) the percentage of open frontal area at the inlet part of the exhaust gas of 40 to 95%, preferably 50 to 85%.

5 Claims, No Drawings

METHOD FOR PURIFYING EXHAUST GAS FROM A DIESEL ENGINE

This application is a continuation of application Ser. No. 08/079,843, filed Jun. 22, 1993 now abandoned which in turn is a continuation of application Ser. No. 07/826,663, filed Jan. 29, 1992, now abandoned, which is a continuation of application Ser. No. 07/475,929, filed Feb. 6, 1990, now abandoned.

BACKGROUND OF THE INVENTION

This invention relates to a flow-through type honeycomb catalyst for purification of harmful components in exhaust gases from diesel engines.

BACKGROUND TECHNIQUE

In recent years, particulate substances in diesel engine exhaust gases (composed mainly of solid carbonaceous fine particles, sulfur-containing fine particles such as sulfate particles and liquid or solid high-molecular-weight hydrocarbon fine particles) have raised an environmental and hygienic problem. These fine particles contain harmful components such as carcinogenic substances, and their particles are mostly less than 1 micron in size, and are prone to float in the air and to be inhaled upon respiration. Much consideration has therefore been given to this problem so as to set rigorous restrictions on the discharge of these fine particles from diesel engines.

As methods for purification of these fine particles substances, so-called filter methods have hitherto been carried out. That is, these filter methods are a method which comprises catching fine particle substances by filtering an exhaust gas from a diesel engine through a heat resistant gas filter (ceramic form, wire mesh, foamed metal, wall flow type ceramic honeycomb or the like), regenerating the filter by burning the accumulated carbonic fine particles using a heating means such as a burner or electric heater when pressure loss increases, and repeatedly using the regenerated filter; a method wherein frequency of the combustion and regeneration in the above method is reduced by depositing catalytic substances on the filter; a method wherein fine particle substances are burned and purified under usual exhaust conditions (gas composition and temperature), namely without particular heating by depositing catalyst substances on the filter; etc.

However, these filter methods have problems, for example, of breakage of the filter structures during combustion of the fine particle substances and regeneration of the filter, blocking of the filter by accumulation of ash components (calcium oxide, zinc oxide, phosphorus pentoxide, etc.) which are derived from the engine oil and caught together with the fine particle substances, and deterioration of activity of the catalysts. Therefore, it cannot still be declared that these filter methods are fully satisfactory methods.

On the other hand, recently according to improvements of diesel engines, there is a tendency that on the one hand content of the fine particle substances in exhaust gases from diesel engines is reduced, but on the other hand rate of SOF (components soluble in organic solvents; Soluble Organic Fraction) contained in the fine particle substances increases, and thus these exhaust gases are different from those of exhaust gases from current diesel engines in characteristics. However, there has so far been proposed no catalyst which is suitable for purification of exhaust gases having such characteristics.

SUMMARY OF THE INVENTION

Thus the object of the present invention is to provide a practical catalyst having a high purification efficiency and excellent in durability for use in purification of exhaust gases from the improved diesel engines which have a low content of fine particle substances and wherein the fine particle substances have a high content of SOF.

DETAILED DESCRIPTION OF THE INVENTION

There is provided as a catalyst capable of attaining the above object a catalyst for purification of an exhaust gas from a diesel engine which catalyst is a flow-through type honeycomb catalyst having through cells parallel to the direction of flow of the gas, wherein its cross-sectional area at the inlet of the exhaust gas cut by a face vertical to the direction of flow of the gas is 10 to 100 $cm^2$, preferably 20 to 80 $cm^2$ per liter of the displacement of the engine, the hydraulic diameter of the through cells is 1.00 to 2.00 mm, preferably 1.10 to 1.40 mm, and percentage of an open frontal area at the inlet of the exhaust gas is 40 to 95%, preferably 50 to 85%.

Exhaust gases to be passed through the flow-through type honeycomb catalyst of the invention are preferably those from diesel engines which contain 100 mg or less of fine particle substances per $m^3$ of the exhaust gas at an exhaust gas temperature of 200° C. or less and wherein the content of SOF in the fine particle substances is 20% or more.

Generally, most of the components contained in SOF exist in a gaseous form at a temperature of 200° C. or more and exist in a form of liquid fine particles at a temperature of 200° C. or less. Thus, in case that a flow-through type honeycomb catalyst having the same shape as that of a usual catalyst for purification of exhaust gases from gasoline engines is used for purification of diesel engine exhaust gases, there arises a problem such that when the catalyst is exposed to temperatures of 200° C. or less, accumulation of fine particle substances due to deposition of SOF takes place at the inlet part of the flow-through type honeycomb catalyst and thereby after lapse of a long time the inlet part of the cells is completely blocked. Once blockage takes place, gas amount passing through the cell decreases and performance of the catalyst is lowered, and moreover for the purpose of elimination of the blockage by the fine particle substances to regeneration of the catalyst operation conditions of the engine under high load and high revolution become necessary. However, it is difficult to appropriately obtain such high load and high revolution conditions under usual traveling, and it becomes more difficult under traffic jam conditions.

On the other hand, in case of the flow-through type honeycomb catalyst of the invention, when it is exposed to an atmosphere of diesel engine exhaust gas of 200° C. or less for a long time, blockage of the cells due to deposition of SOF does not take place, and moreover it is possible for the catalyst to display an excellent efficiency of purification of harmful components under usually employed operating conditions.

The flow-through type honeycomb catalyst of the invention must be one wherein its cross-sectional area at the inlet part of the exhaust gas cut by a face vertical to the direction of flow of the gas (i.e. the direction of the through cells) is 10 to 100 $cm^2$ per liter of the displacement of the engine. If the cross-sectional area is less than 10 $cm^2$, back pressure increases in accordance with increase of linear velocity of exhaust gas passing through each through cell, and moreover the structure is destroyed, for example, by collisions of the fine particle substances with the flow-through type honeycomb catalyst. On the other hand, if the cross-sectional area goes beyond 100 cm$^2$, SOF tends to deposit on the catalyst due to lowering of linear velocity of the exhaust gas passing through each through cell and as a result blockage of the cells increases. Further, catalysts having too large of a cross-sectional area are not practical because it is virtually difficult to install them in exhaust pipes of diesel engines.

Another condition of the flow-through type honeycomb catalyst of the invention is, as previously stated, that the hydraulic diameter of each cell through which an exhaust gas flows linearly must be 1.00 to 2.00 mm. In case that the hydraulic diameter is smaller than 1.00 mm, when the catalyst is exposed to an atmosphere of a diesel engine exhaust gas of 200° C. or less, blockage of the cells due to deposit of SOF at the inlet part is liable to occur. On the other hand, in case that the hydraulic diameter exceeds 2.00 mm, purification performances of the catalyst is strikingly lowered mainly due to lowering of contact efficiency of the exhaust gas with the catalyst surface inside the cells, compared to the case wherein catalyst volume and open frontal area are identical and the hydraulic diameter is 2.00 mm or less.

Still another condition of the flow-through type honeycomb catalyst of the invention is, as previously stated, that its percentage of open frontal area at the inlet part of an exhaust gas must be 40 to 95%. If the percentage of open frontal area is less than 40%, the geometrical surface area per unit volume of the flow-through type honeycomb catalyst in contact with the exhaust gas is lowered, and thereby purification performances of the catalyst is lowered and at the same time back pressure increases. On the other hand, if the percentage of open frontal area is beyond 95%, the separation walls constituting the flow-through type honeycomb catalyst become thin and an adequate strength cannot be obtained.

The flow-through type honeycomb catalyst of the invention may be an extruded catalyst or a deposited catalyst, but when installation thereof into diesel engine automobile such as trucks is supposed, it is preferred that the catalyst is a structure having both strength and heat resistance, for example, a structure body consisting of a catalytically active component deposited on a honeycomb carrier.

With regard to the honeycomb carrier, ordinary ones can be used, and preferred examples thereby are, for example, ceramic honeycombs using as their raw materials cordierite, mullite, α-alumina, zirconia, titania, titanium phosphate, aluminum titanate, spodumene, alumino-silicate, magnesium silicate or the like; and metal honeycombs as monolithic structures using a heat resistant metal having oxidation resistance such as stainless steel or Fe-Cr-Al alloy. Particularly preferred among them are cordierite ceramic honeycomb and metal honeycombs.

Although the shape (cell shape) of the through cells of flow-through type honeycomb catalyst is not restricted, hexagon, quadrilateral, triangle and corrugation type are preferred.

Although catalytically active components in the flow-through type honeycomb catalysts of the invention as are not particularly limited, preferred examples thereof are platinum, palladium, rhodium, iridium, vanadium, molybdenum, copper, silver, gold, rare earth elements are perovskite composite oxides of partially substituted type having oxygen vacancy. These catalytically active components can be used alone or in combination of two or more of them. However, in case of catalysts for use in purification of exhaust gases from diesel engines using fuels having a sulfur content of 0.1 wt. % or more, it is not desirable to use platinum as the catalytically active component. The reason is that since platinum has a high oxidizing ability of sulfur dioxide ($SO_2$) in the exhaust gas, there is a fear that a large amount of sulfates ($SO_3$ and sulfuric acid mist which are oxidized products of $SO_2$) are produced and thereby sulfur type fine particles increase.

A flow-through type honeycomb catalyst of the invention in case of it being an extruded catalyst can be prepared by extruding catalytically active component(s) as above-described together with refractory inorganic oxide(s) such as alumina, silica, titania, zirconia or zeolite into a flow-through type honeycomb structure, for example by extrusion molding. A flow-through type honeycomb catalyst of the invention in case of it being a deposited catalyst can be prepared by depositing catalytically active component(s) as above-described directly or together with refractory inorganic oxide(s) on a honeycomb carrier as above-described.

INDUSTRIAL APPLICABILITY

The catalyst of the present invention for use in purification of harmful components in diesel engine exhaust gases, namely a flow-through type honeycomb catalyst characterized by that its cross-sectional area at the inlet part of the exhaust gas cut by a face vertical to the direction of flow of the gas (i.e. the direction of the through holes) is 10 to 100 cm$^2$, preferably 20 to 80 cm$^2$ per liter of the displacement of the engine, the hydraulic diameter of the through cells is 1.00 to 2.00 mm, preferably 1.10 to 1.40 mm, and percentage of open frontal area at the inlet part of the exhaust gas is 40 to 95%, preferably 50 to 85%, does not cause blockage of the cells due to deposition of SOF even when the catalyst is exposed to an atmosphere of a diesel engine exhaust gas of 200° C. or less for a long time; and moreover makes it possible that its excellent harmful component-purifying performance is displayed with good reproducibility over a long time under usual driving conditions of diesel engines.

Further, although there are many harmful components contained in SOF such as PAH (Poly Nuclear Aromatic hydrocarbon), for example, which is said to be a carcinogenic substance found in the fine particles of SOF, the catalyst of the invention can make these substances harmless.

BEST MODE FOR PERFORMING THE INVENTION

The present invention is further described in detail below according to examples and comparative examples, but it goes without saying that the invention is not limited to these examples.

EXAMPLE 1

Alumina (3 kg) having a specific surface area of 130 m$^2$/g was weighed and wet-pulverized together with water to give a slurry. A cylindrical flow-through type stainless steel honeycomb carrier (diameter 140 mm, length 150 mm, cell shape corrugation type, having 300 through cells per 1 in.$^2$) was immersed in the slurry. The excess of the slurry was removed, and it was dried at 150° C. for 2 hours and calcined at 500° C. for 2 hours to obtain a structure depositing 150 g of alumina per liter of the structure.

This alumina-deposited structure was immersed in 2.5 l of a solution obtained by dissolving palladium nitrate containing 19.2 g of palladium and rhodium nitrate containing 3.8 g of rhodium in deionized water. The excess of the solution was removed, and the carrier was dried at 150° C. for 2 hours and calcined at 500° C. for 2 hours to obtain a flow-through type honeycomb catalyst deposited with 1.0 g of palladium and 0.2 g of rhodium respectively in terms of metal per liter of the structure.

This flow-through type honeycomb catalyst had an hydraulic diameter of the through cells of 1.27 mm and a percentage of open frontal area of 84%.

EXAMPLES 2 TO 16 AND COMPARATIVE EXAMPLES 1 TO 9

Predetermined amounts of alumina were deposited on various cordierite honeycomb carriers (cell shape: quadrilateral) respectively, and 1 g of palladium and 0.2 g of rhodium were deposited on each of the alumina-deposited structures per liter of the structure, in the same manner as in Example 1 to obtain flow-through type honeycomb catalysts of Examples 2 to 16 and Comparative examples 1 to 9.

There are indicated in Table-1 various dimensional properties of the honeycomb carriers used in the examples and comparative examples, and hydraulic diameter of the through cells, percentage of open frontal area, amount of the alumina deposited and geometrical surface area in respect of the flow-through type honeycomb catalysts obtained using these carriers.

TABLE 1

| | Honeycomb carrier | | | | | Honeycomb catalyst | | | |
|---|---|---|---|---|---|---|---|---|---|
| | Material | Shape diameter × length (mm) (mm) | Shape of the through cell | cells/ in$^2$ | Channel wall thickness (mil) | Hydraulic diameter (mm) | Percentage of open frontal area (%) | Deposited Al$_2$O$_3$ amount (g/l) | Geometrical surface area (m$^2$/l) |
| Example 1 | metal | 140 × 150 | corrugation type | 300 | 2 | 1.27 | 84 | 150 | 2.36 |
| Example 2 | cordierite | " | quadrilateral | 400 | 6 | 1.08 | 72 | 49 | 2.68 |
| Example 3 | " | " | " | 300 | 12 | 1.10 | 57 | 51 | 2.05 |
| Example 4 | " | " | " | 300 | 8 | 1.20 | 68 | 53 | 2.23 |
| Example 5 | " | " | " | 300 | 8 | 1.11 | 56 | 160 | 2.01 |
| Example 6 | " | " | " | 200 | 12 | 1.42 | 62 | 51 | 1.76 |
| Example 7 | " | " | " | 200 | 12 | 1.35 | 58 | 106 | 1.67 |
| Example 8 | " | " | " | 200 | 12 | 1.28 | 51 | 140 | 1.59 |
| Example 9 | " | " | " | 100 | 17 | 1.91 | 57 | 102 | 1.18 |
| Example 10 | " | " | " | 100 | 17 | 1.72 | 46 | 190 | 1.11 |
| Example 11 | " | 190 × 100 | " | 400 | 6 | 1.08 | 73 | 40 | 2.80 |
| Example 12 | " | 90 × 300 | " | 400 | 6 | 1.05 | 70 | 60 | 2.41 |
| Example 13 | " | 190 × 100 | " | 200 | 12 | 1.39 | 56 | 92 | 1.71 |
| Example 14 | " | 90 × 300 | " | 200 | 12 | 1.36 | 58 | 102 | 1.65 |
| Example 15 | " | 190 × 100 | " | 100 | 17 | 1.69 | 44 | 221 | 1.03 |
| Example 16 | " | 90 × 300 | " | 100 | 17 | 1.73 | 48 | 196 | 1.11 |
| | Honeycomb carrier | | | | | Honeycomb catalyst | | | |
| | Material | Shape diameter × length (mm) (mm) | Shape of the through cell | cells/ in$^2$ | Rib thickness (mill) | Hydraulic diameter (mm) | Percentage of open frontal area (%) | Deposited Al$_2$O$_3$ amount (g/l) | Geometrical surface area (m$^2$/l) |
| Comparative example 1 | cordierite | 140 × 150 | quadrilateral | 400 | 6 | 0.96 | 60 | 148 | 2.55 |
| Comparative example 2 | " | " | " | 100 | 17 | 2.05 | 64 | 53 | 1.24 |
| Comparative example 3 | " | 230 × 50 | " | 400 | 6 | 1.02 | 73 | 57 | 2.65 |
| Comparative example 4 | " | " | " | 200 | 12 | 1.35 | 55 | 101 | 1.69 |
| Comparative example 5 | " | " | " | 100 | 17 | 1.75 | 48 | 206 | 1.09 |
| Comparative example 6 | " | 60 × 600 | " | 400 | 6 | 1.06 | 71 | 55 | 2.53 |

TABLE 1-continued

| | | | | | | | | |
|---|---|---|---|---|---|---|---|---|
| Comparative example 7 | " | " | " | 200 | 12 | 1.35 | 55 | 98 | 1.60 |
| Comparative example 8 | " | " | " | 100 | 17 | 1.70 | 43 | 215 | 1.05 |
| Comparative example 9 | " | 140 × 150 | " | 100 | 17 | 1.35 | 28 | 412 | 0.83 |

EXAMPLE 17

The following tests were carried out on the flow-through type honeycomb catalysts of Examples 1 to 16 and Comparative examples 1 to 9 using a commercially available turbo-charged direct injection type diesel engine (4-cylindered, 3,500 cc).

Initial Test

Exhaust amount of fine particle substances in the exhaust gas at the inlet and outlet under the conditions of an engine revolution speed of 2,500 rpm, a torque of 10.3 kg.m and a temperature at the catalyst inlet of 300° C. was measured by the dilution tunnel method, and purification percentage (%) of the fine particle substances was determined therefrom. Further, content of gaseous hydrocarbon (THC) and content of CO in the exhaust gas at the catalyst inlet and outlet and back pressure were measured, and conversion rate (%) of THC, conversion rate (%) of CO and back pressure (mm H₂O) due to the flow-through type honeycomb catalyst were determined therefrom.

Durability Test in Idling

Durability test of the flow-through type honeycomb catalyst was carried out under the conditions of an engine revolution speed of 800 rpm, a torque of 1.0 kg.m and a catalyst inlet temperature of 80° C., 30 hours thereafter blockage state of the catalyst at the inlet part was observed, and rate of the cells which came to be blocked (blockage percentage (%)) was determined by the following equation:

Blockage percentage (%)=

Blockage percentage (%) =

$$\left(1 - \frac{\text{total number of open cells after the durability test}}{\text{total number of open cells before the durability test}}\right) \times 100$$

The results of foregoing [Initial test] and [Durability test in idling] were indicated in Table-2 (Examples 1 to 16) and Table-3 (Comparative examples 1 to 9).

TABLE 2

| Catalyst | Hydraulic diameter (mm) | Percentage of open frontal area (%) | Cross-sectional area/Displacement (cm²/l) | Idling × 30 hours Blockage percentage (%) | Fine particle substance (300° C.) Purification percentage (%) | THC (300° C.) Conversion percentage (%) | CO (300° C.) Convertion percentage (%) | Back Pressure (mmH₂O) |
|---|---|---|---|---|---|---|---|---|
| Example 1 | 1.27 | 84 | 44.0 | 0 | 55 | 74 | 82 | 101 |
| Example 2 | 1.08 | 72 | " | 4 | 49 | 69 | 78 | 295 |
| Example 3 | 1.10 | 57 | " | 0 | 51 | 74 | 84 | 216 |
| Example 4 | 1.20 | 68 | " | 0 | 56 | 68 | 74 | 159 |
| Example 5 | 1.11 | 56 | " | 0 | 52 | 67 | 78 | 226 |
| Example 6 | 1.42 | 62 | " | 0 | 47 | 62 | 73 | 124 |
| Example 7 | 1.35 | 58 | " | 0 | 53 | 71 | 75 | 153 |
| Example 8 | 1.28 | 51 | " | 0 | 57 | 76 | 83 | 214 |
| Example 9 | 1.91 | 57 | " | 0 | 39 | 49 | 61 | 97 |
| Example 10 | 1.72 | 46 | " | 0 | 45 | 52 | 62 | 141 |
| Example 11 | 1.08 | 73 | 81.0 | 6 | 50 | 65 | 71 | 67 |
| Example 12 | 1.05 | 70 | 18.2 | 0 | 48 | 62 | 73 | 905 |
| Example 13 | 1.39 | 56 | 81.0 | 0 | 47 | 64 | 69 | 69 |
| Example 14 | 1.36 | 58 | 18.2 | 0 | 48 | 64 | 70 | 818 |
| Example 15 | 1.69 | 44 | 81.0 | 0 | 41 | 46 | 54 | 55 |
| Example 16 | 1.73 | 48 | 18.2 | 0 | 43 | 51 | 58 | 679 |

TABLE 3

| Catalyst | Hydraulic diameter (mm) | Percentage of open frontal area (%) | Cross-sectional area/Displacement (cm²/l) | Idling × 30 hours Blockage percentage (%) | Fine particle substance (300° C.) Purification percentage (%) | THC (300° C.) Conversion percentage (%) | CO (300° C.) Convertion percentage (%) | Back Pressure (mmH₂O) |
|---|---|---|---|---|---|---|---|---|
| Comparative exauple 1 | 0.96 | 60 | 44.0 | 72 | 56 | 75 | 86 | 325 |
| Comparative example 2 | 2.05 | 64 | 44.0 | 0 | 18 | 21 | 24 | 73 |
| Comparative example 3 | 1.02 | 73 | 118.7 | 57 | 41 | 59 | 63 | 23 |
| Comparative example 4 | 1.35 | 55 | 118.7 | 28 | 38 | 58 | 69 | 26 |
| Comparative example 5 | 1.75 | 48 | 118.7 | 21 | 31 | 42 | 48 | 21 |
| Comparative example 6 | 1.06 | 71 | 8.0 | 1 | 43 | 56 | 63 | 3781 |
| Comparative example 7 | 1.36 | 55 | 8.0 | 0 | 41 | 58 | 66 | 3110 |
| Comparative example 8 | 1.70 | 43 | 8.0 | 0 | 33 | 45 | 49 | 2330 |
| Comparative example 9 | 1.35 | 28 | 44.0 | 0 | 14 | 19 | 20 | 1058 |

We claim:

1. A method for treating exhaust gases from a diesel engine, said gases comprising, at 200° C. or less, 100 mg or less of fine particulate substances per m³ of exhaust gas, and said fine particulate substances comprising at least 20% by weight of soluble organic fraction, to reduce the amount of soluble organic fraction-containing particulate substances contained therein, said method comprising passing the particulate substance-containing diesel engine exhaust gases through a catalyst which comprises a flow-through metal or ceramic honeycomb carrier having 250 through cells per square inch parallel to the direction of flow of the exhaust gases and at least one catalytically active component deposited thereon selected from the group consisting of platinum, palladium, rhodium, iridium, vanadium, molybdenum, copper, silver, gold, rare earth elements and partially substituted perovskite composite oxides having an oxygen vacancy, and optionally, at least one refractory inorganic oxide selected from the group consisting of alumina, silica, titania, zirconia, and zeolite, said catalyst having a cross-sectional area, at the inlet part of the exhaust gases cut by a plane perpendicular to the direction of flow of the exhaust gases of 20 to 80 cm² per liter of the displacement of the engine, a hydraulic diameter of the through cells of 1.10 to 1.40 mm, and a percentage of open frontal area at the inlet part of the catalyst of from 50 to 85%.

2. The method of claim 1, wherein the through cells of the catalyst are formed in the shape of hexagonal, quadrilaterial, triangular or corrugated cells.

3. The method of claim 1, wherein said at least one catalytically active component comprises at least platinum.

4. The method for treating diesel engine exhaust gases according to claim 1, wherein the catalyst is an extruded flow-through honeycomb catalyst prepared by extruding at least one catalytically active component selected from the group consisting of platinum, palladium, rhodium, iridium, vanadium, molybdenum, copper, silver, gold, rare earth elements and partially substituted perovskite composite oxides having an oxygen vacancy, and at least one refractory inorganic oxide selected from the group consisting of alumina, silica, titania, zirconia, and zeolite.

5. A method for removing fine particulate substances from exhaust gases generated by a diesel engine of a vehicle before the exhaust gases are introduced into the atmosphere, said method comprising passing a particulate substance-containing diesel engine exhaust gas which, at a temperature of 200° C. or less, contains 100 milligrams or less of fine particulate substances, per cubic meter of exhaust gas, and wherein the fine particulate substances comprise at least 20% by weight of soluble organic fraction, through a catalyst which comprises a flow-through metal or ceramic honeycomb carrier having 200 through cells per square inch parallel to the direction of flow of the exhaust gases and at least one catalytically active component deposited thereon selected from the group consisting of platinum, palladium, rhodium, iridium, vanadium, molybdenum, copper, silver, gold, rare earth elements and partially substituted perovskite composite oxides having an oxygen vacancy, and optionally, at least one refractory inorganic oxide selected from the group consisting of alumina, silica, titania, zirconia and zeolite, the catalyst having a cross-sectional area at the inlet part of the exhaust gases cut by a plane perpendicular to the direction of flow of the exhaust gases of 20 to 80 cm² per liter of the displacement of the engine, an hydraulic diameter of the through cells of 1.10 to 1.40 mm, and a percentage of open frontal area at the inlet part of the catalyst of from 50 to 85%.

* * * * *